US006907844B1

(12) United States Patent
Crist et al.

(10) Patent No.: US 6,907,844 B1
(45) Date of Patent: Jun. 21, 2005

(54) STABILIZING POST AND METHOD FOR BARK CONTROLLER

(75) Inventors: Timothy J. Crist, Tucson, AZ (US); Timothy T. Duncan, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 0 days.

(21) Appl. No.: 10/752,726

(22) Filed: Jan. 7, 2004

(51) Int. Cl.[7] .............................................. A01K 27/00
(52) U.S. Cl. ...................... 119/718; 119/859; 119/908
(58) Field of Search ........................ 119/718, 720, 859, 119/908; 231/7

(56) References Cited

U.S. PATENT DOCUMENTS

| | | | |
|---|---|---|---|
| 4,802,482 A | 2/1989 | Gonda et al. ............... | 119/720 |
| 4,947,795 A | 8/1990 | Farkas ......................... | 119/718 |
| 5,193,484 A | 3/1993 | Gonda ......................... | 119/859 |
| 5,769,032 A * | 6/1998 | Yarnall, Sr. et al. ........ | 119/721 |
| 5,911,199 A * | 6/1999 | Farkas et al. ............... | 119/859 |
| 6,058,889 A * | 5/2000 | Van Curen et al. ......... | 119/721 |
| 2004/0000274 A1 * | 1/2004 | James ......................... | 119/859 |

* cited by examiner

*Primary Examiner*—Robert P. Swiatek
(74) *Attorney, Agent, or Firm*—Cahill, von Hellens & Glazer P.L.C.

(57) ABSTRACT

An electronic apparatus (1) for control or training of an animal includes a housing (2) supported by a strap against the animal's skin, first and second stimulus probes (5) connected to a surface (9) of the housing, and control circuitry in the housing including output terminals selectively producing aversive stimulus. A stabilizing member (7) is connected to a location of the surface (9) of the housing that is offset from a straight line between the first and second stimulus electrodes (5) so that conductive tips of the first and second stimulus electrodes and a tip of the stabilizing post define a triangle, whereby the conductive tips of the first and second stimulus electrodes and the tip of the stabilizing member are pressed against the skin of the animal and prevent rocking of the conductive tips of the first and second stimulus electrodes against the skin of the animal to reduce the occurrence and/or severity of skin sores.

9 Claims, 5 Drawing Sheets

STABILIZING POST AND METHOD FOR BARK CONTROLLER

BACKGROUND OF THE INVENTION

The present invention relates generally to collar-mounted electronic animal training devices, especially dog training devices, and more particularly to improvements therein reduce the occurrence and severity of skin sores, especially neck skin sores.

A variety of electronic dog training collars and bark limiters have been utilized for selectively applying precisely controlled electrical shock stimulus to a dog.

The closest prior art is believed to include the present assignee's Bark Limiter product and commonly assigned U.S. Pat. No. 4,947,795 by G. Farkas entitled "Barking Control Device and Method", issued Aug. 14, 1990 and incorporated herein by reference. U.S. Pat. No. 4,947,795 discloses a bark training device which allows a dog to control the level of electrical stimulus in response to its own barking behavior by means of circuitry in a collar-mounted electrical device that detects the onset of barking and initially produces only a single low level electrical stimulus pulse that gets the dog's attention, but does not initially produce a highly unpleasant level of stimulation. If the dog continues barking, the stimulation levels of the electrical shock pulses are increased at the onset of each barking episode in a stepwise fashion. Another prior art reference is the assignee's U.S. Pat. No. 4,802,482 entitled "Method and Apparatus for Remote Control of Animal Training Stimulus" by Gonda et al., issued Feb. 7, 1989 and incorporated herein by reference.

A shortcoming of most prior art collar-mounted dog or other animal training products is that "rocking" of their stimulation electrodes often causes neck sores on the dog.

Commonly owned U.S. Pat. No. 5,193,484 discloses improved electrodes 6 and 7 having upper ends that protrude approximately 0.1 to 0.25 inches above the upper ends of plastic insulators 4 and 5, respectively. This structure effectively eliminates the large parallel resistance that would exist between the two un-insulated electrodes if the fur of the dog were wet and therefore also eliminates the shunting of a large portion of the electroshock current away from the neck of the dog that would occur if the fur of the dog were wet. Such shunting would, of course, greatly decrease the shock stimuli that would be actually applied to the neck of the dog. By providing insulative housings 4 and 5 around all but the extreme upper tips of the electrodes, the parallel resistances referred to are minimized and adequate electroshock signals are applied to the dog when it is either drive or wet. U.S. Pat. No. 5,193,484 discloses that for most short-haired dogs, the tips 6 and 7 should be provided so that they extend approximately 100 mils (0.1 inches) above the insulators 4 and 5, effective electroshock stimulus can be applied to the dog's neck regardless of whether the dog is dry or soaking wet or swimming in water, and for long-haired dogs, the tips 6 and 7 should extend as much as about one-fourth of an inch above the insulators.

A Tucson, Ariz. company known as "Eltrex-4" has collar-mounted electrical stimulus product including a four-point stimulus electrode contact arrangement in which the stimulus probes are short enough that rocking of the stimulus electrodes is not a substantial problem. This product includes multiple electro-stimulus electrode bases that conduct electro-stimulus signals of various intensities, and the user selects the desired intensity by using only two conductive stimulus probes, which are threaded into two of the electro-stimulus electrode bases so the desired stimulus level is applied via those two conductive stimulus probes. Insulating probes are threaded into the remaining electro-stimulus electrode bases to collar and electrically isolate the electro-stimulus electrode bases conducting signals other than the desired stimulus level.

Accordingly, there is an unmet need for an improved collar-mounted animal training device that substantially reduces the occurrence and/or severity of neck sores on the animal wearing the device.

There also is an unmet need for an improved bark control device that provides a convenient and effective self-test capability.

SUMMARY OF THE INVENTION

Accordingly, it is an object of the invention to provide an improved animal training device, especially a collar-mounted animal training device, that substantially reduces the occurrence and/or severity of skin sores, especially neck sores, on the animal wearing the device.

Briefly described, and in accordance with one embodiment, the present invention provides an electronic apparatus (1) for control or training of an animal including a housing (2) supported by a strap against the animal's skin, first and second stimulus probes (5) connected to a surface (9) of the housing, and control circuitry in the housing including output terminals selectively producing aversive stimulus. A stabilizing member (7) is connected to a location of the surface (9) of the housing that is offset from a straight line between the first and second stimulus electrodes (5) so that conductive tips of the first and second stimulus electrodes and a tip of the stabilizing post define a triangle, whereby the conductive tips of the first and second stimulus electrodes and the tip of the stabilizing member are pressed against the skin of the animal and prevent rocking of the conductive tips of the first and second stimulus electrodes against the skin of the animal to reduce the occurrence and/or severity of skin sores.

In the described embodiment, a collar-mounted electronic apparatus (1) for control of barking by a dog includes a housing (2) supported by a collar for attachment to the dog's neck and first and second stimulus electrodes (5) connected to a top surface (9) of the housing. A vibration sensor (6) is supported by the housing for detecting vibrations caused by barking by the dog. Control circuitry in the housing has an input coupled to an output of the vibration sensor and includes output terminals coupled to producing aversive stimulus signals between the first and second stimulus electrodes in response to barking by the dog. A stabilizing post (7) is attached to a location of the top surface (9) of the housing that is offset from a straight line between the first and second stimulus electrodes (5) so that conductive tips of the first and second stimulus electrodes and a tip of the stabilizing post define a triangle. Conductive tips of the first and second stimulus electrodes and the tip of the stabilizing post are pressed against the neck of the dog and prevent rocking of the conductive tips of the first and second stimulus electrodes against the neck of the dog to reduce the occurrence and/or severity of neck sores.

BRIEF DESCRIPTION OF THE DRAWINGS

FIGS. 4-1 and 4-2 are schematic diagrams of the circuitry included in the housing of the bark limiter of FIG. 1.

DETAILED DESCRIPTION OF THE PREFERRED EMBODIMENTS

A preferred embodiment of a dog bark limiter of the present invention includes a stabilizing post, which can be either conductive or non-conductive, of substantially the same height as the two stimulus electrodes but offset from a straight line extending between them in order to stabilize the bark limiter and thereby reduce the occurrence of and the severity of neck sores that may occur on the neck of the dog as a result of "rocking" of the stimulus electrodes thereon.

Figure 1:
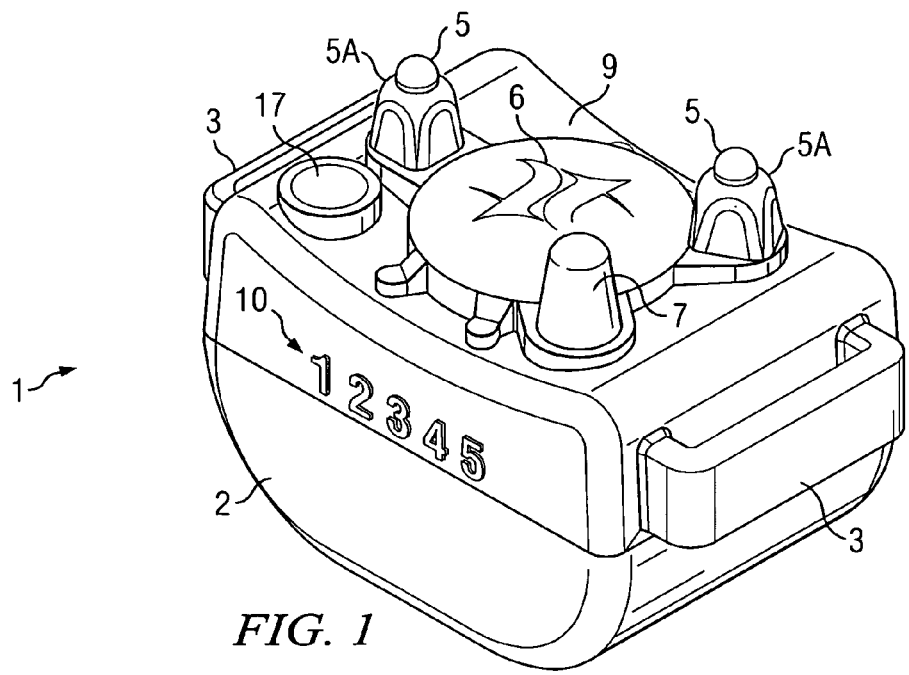
FIG. 1 is a perspective view of a collar-mounted bark limiter unit of the present invention with the collar removed and the two stimulus electrodes removed.
Figure 2:
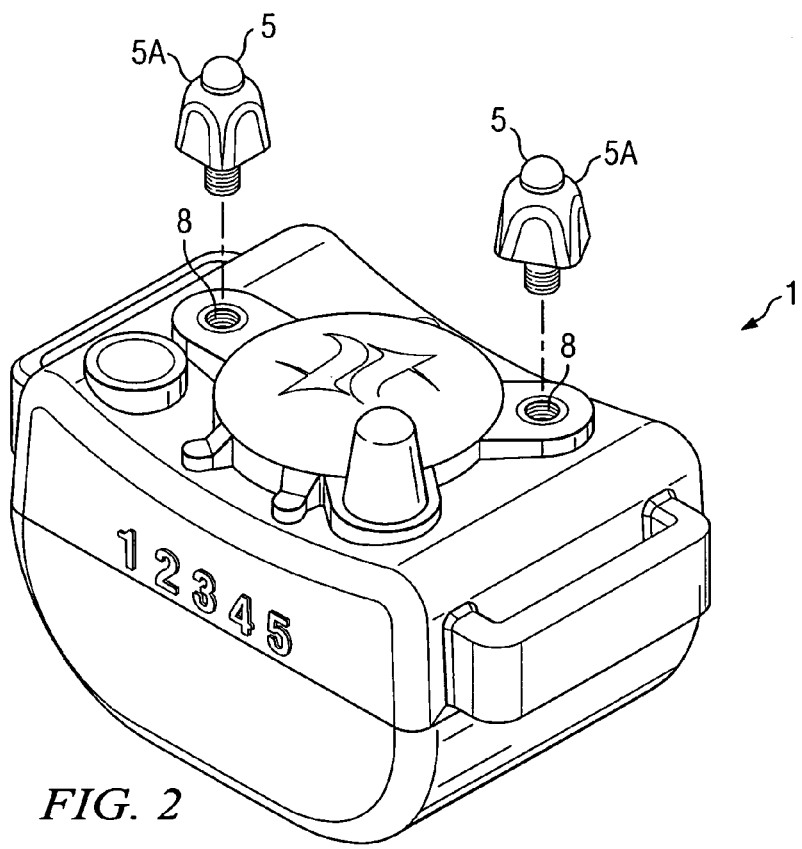
FIG. 2 shows the a partially-exploded view of the bark limiter unit of FIG. 1.

Referring to FIGS. 1, 2, 3A and 3B, bark limiter 1 includes a housing 2 having a lower section 2A and an upper section 2B. The top surface 9 of upper housing section 2B is slightly concave, to better accommodate the curvature of a dog's neck. A pair of collar-retaining loops 3 are attached to opposite ends of upper housing section 2B, as shown. A typical dog collar (not shown) is passed through loops 3 around the bottom surface of housing 2 to fasten bark limiter 1 to the dog's neck. Two stimulus electrodes 5 are threaded into receiving holes 8 (FIG. 2) in the upper surface 9, and their conductive tips are pressed against the dog's neck to make electrical contact therewith when the collar is tightened. As indicated in FIG. 2, stimulus electrodes 5 are removable. The structure and operation of the stimulus electrodes 5 are described in detail in above mentioned commonly owned U.S. Pat. No. 5,193,484, issued Mar. 16, 1993 to Gonda, entitled "Electrode Structure for Collar Mounted Animal Training Apparatus", which is incorporated herein by reference. The upper conductive tips of stimulus electrodes 5 in FIGS. 1 and 2 extend slightly above the insulative housings 5A of stimulus electrodes 5, preferably by approximately 1/10 of an inch, and the total length of the stimulus electrodes is approximately 0.36 inches for short-haired dogs and approximately 0.58 inches long-haired dogs, to avoid the current shunting problems described in U.S. Pat. No. 5,193,484. The previously described rocking of the stimulus electrodes may be relatively insignificant for stimulus electrodes shorter than approximately 0.3 inches in length.

In accordance with one aspect of the present invention, a non-conductive stabilizing post of the same height as stimulus probes 5 is rigidly attached to upper surface 9, and is offset from a straight line between stimulus probes 5 so the stabilizing post 7 and the two stimulus probes 5 define a triangle. This prevents the conductive electrode tips of stimulus electrodes 5 from "rocking" against the dog's neck and avoids or at least reduces the occurrence and severity of sores on the dog's neck that are sometimes caused by the pressure of the stimulus electrodes against the dog's skin. The stabilizing post 7 in conjunction with the stimulus electrodes 5B and 5C provides stable contact of all three with the dog's neck and allows the direction of the collar to be reversed so that stabilizing post 7 and stimulus electrodes 5B and 5C make contact with different areas on the dog's neck, which reduces the occurrence and of and severity of neck sores.

A dome-shaped membrane 6 that preferably is integrally formed with the upper housing section 2B is disposed on upper surface 9 and constitutes part of a vibration sensor 30, which is subsequently described in more detail with reference to FIG. 4. A membrane switch 17 extends through an opening 4 in upper surface 9. The dog owner can repetitively depress membrane switch 17 to select one of five stimulus intensity levels. The selected intensity level is indicated by illumination of a corresponding one of the five indicators identified by reference numeral 10. The above features, except the stimulus probes 5B and 5C, on the upper surface 9 of upper housing 2B are all integrally formed as a single unit.

Figure 3A:
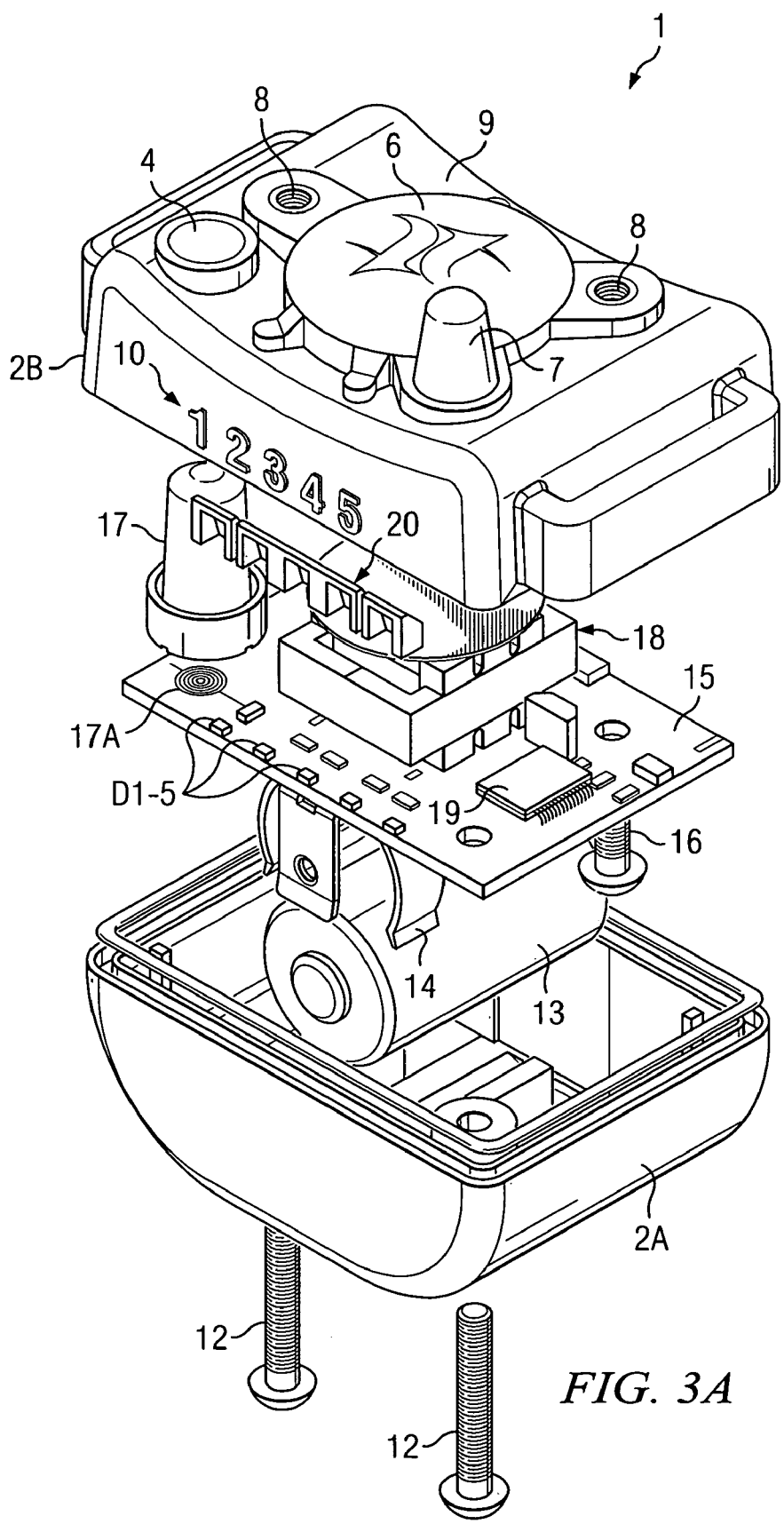
FIG. 3A is a perspective exploded view of the bark limiter unit of FIGS. 1 and 2.
Figure 3B:
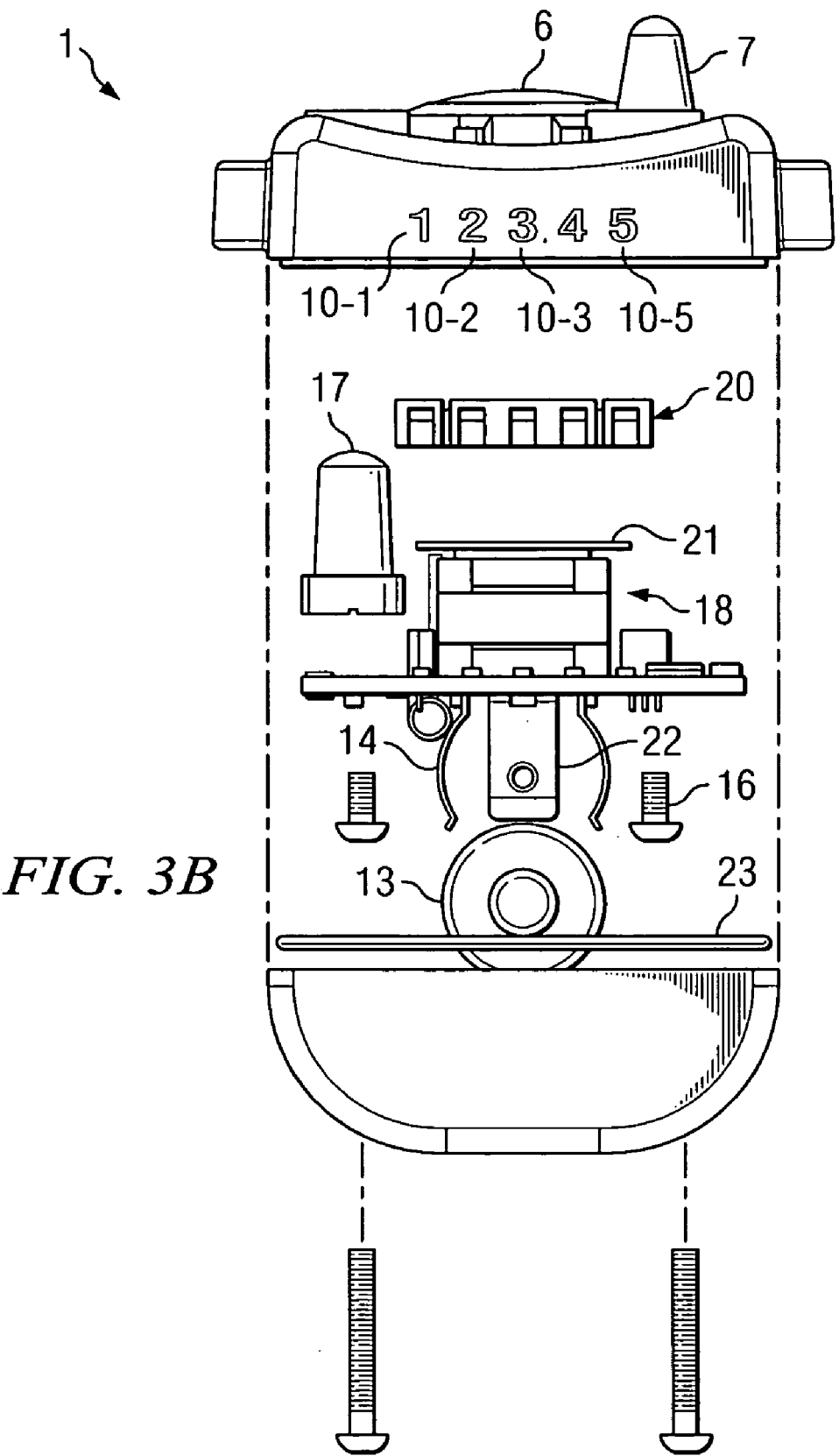
FIG. 3B is a side exploded view of the bark limiter unit as shown in FIG. 3A.

Referring to the exploded views of FIGS. 3A and 3B, lower housing section 2A is attached to upper housing section 2B by means of two screws 12. A printed circuit board 15A contained within housing 2 is attached to upper housing section 2B by means of two screws 16. A 3 volt lithium battery 13 is attached to the bottom of printed circuit board 15A by means of a pair of clips 14. The membrane switch unit 17 is attached to the upper surface of printed circuit board 15A and extends through hole 4 in upper surface 9. A metal trace 17A is contacted to provide a switch closure when the upper surface of membrane switch unit 17 is depressed. An output transformer 18, a microcontroller 19, and five light emitting diodes D1–5 are mounted on the upper surface of printed circuit board 15. As shown in FIG. 3B, a piezoelectric transducer 21 is supported on output transformer 18, and is contacted by a "nipple" 11 (FIG. 5) formed on the underside of dome-shaped membrane 6. Piezoelectric transducer 21 can be a Model P/N: 7BB-20-6 available from Murata Electronics North America, Inc.

The intensity indicators 10-1,2,3,4,5 become illuminated by light emitting diodes D1–5, respectively, as membrane switch 17 is successively depressed. The five LEDs correspond to indicators 10-1,2,3,4,5 to indicate which stimulation level has been selected by means of the membrane switch 17. The LED corresponding to the intensity level selected by means of membrane switch 17 is the one which blinks.

By way of definition, the term "housing" as used herein is intended to encompass any suitable container structure and/or encapsulation material that is used to contain the components of bark limiter 1.

The housing 2 of bark limiter 1 is preferably formed of XYLEX plastic material available from General Electric Corp., although other plastic materials also could be utilized. The material of which membrane 6 is composed could include material other than that of the housing, and could, for example, include encapsulation material that surrounds the sound transducer if it is capable of transmitting sound vibrations from outside of the housing to the sound transducer 21.

Figures 1, 4:
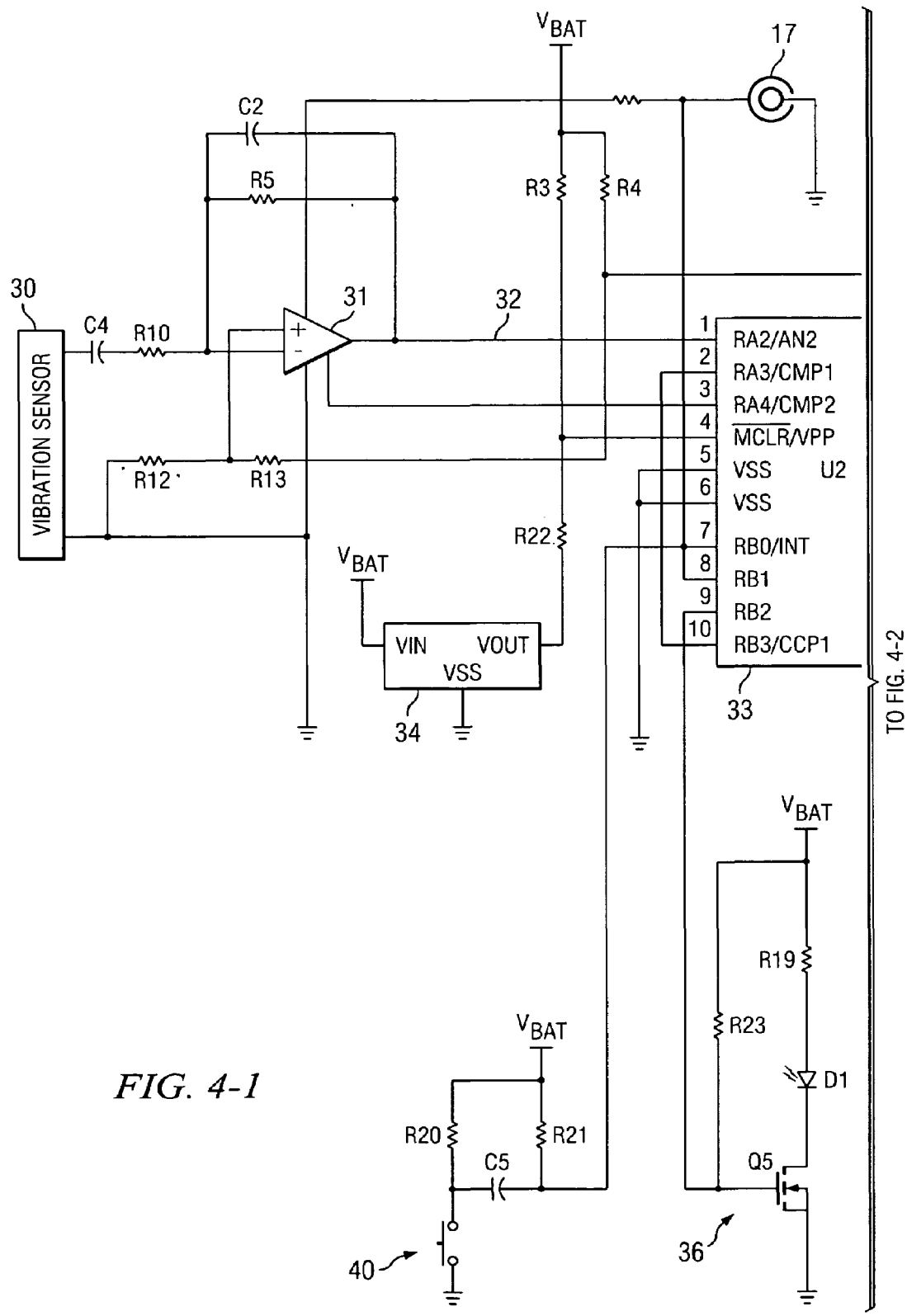
Figures 2, 4:
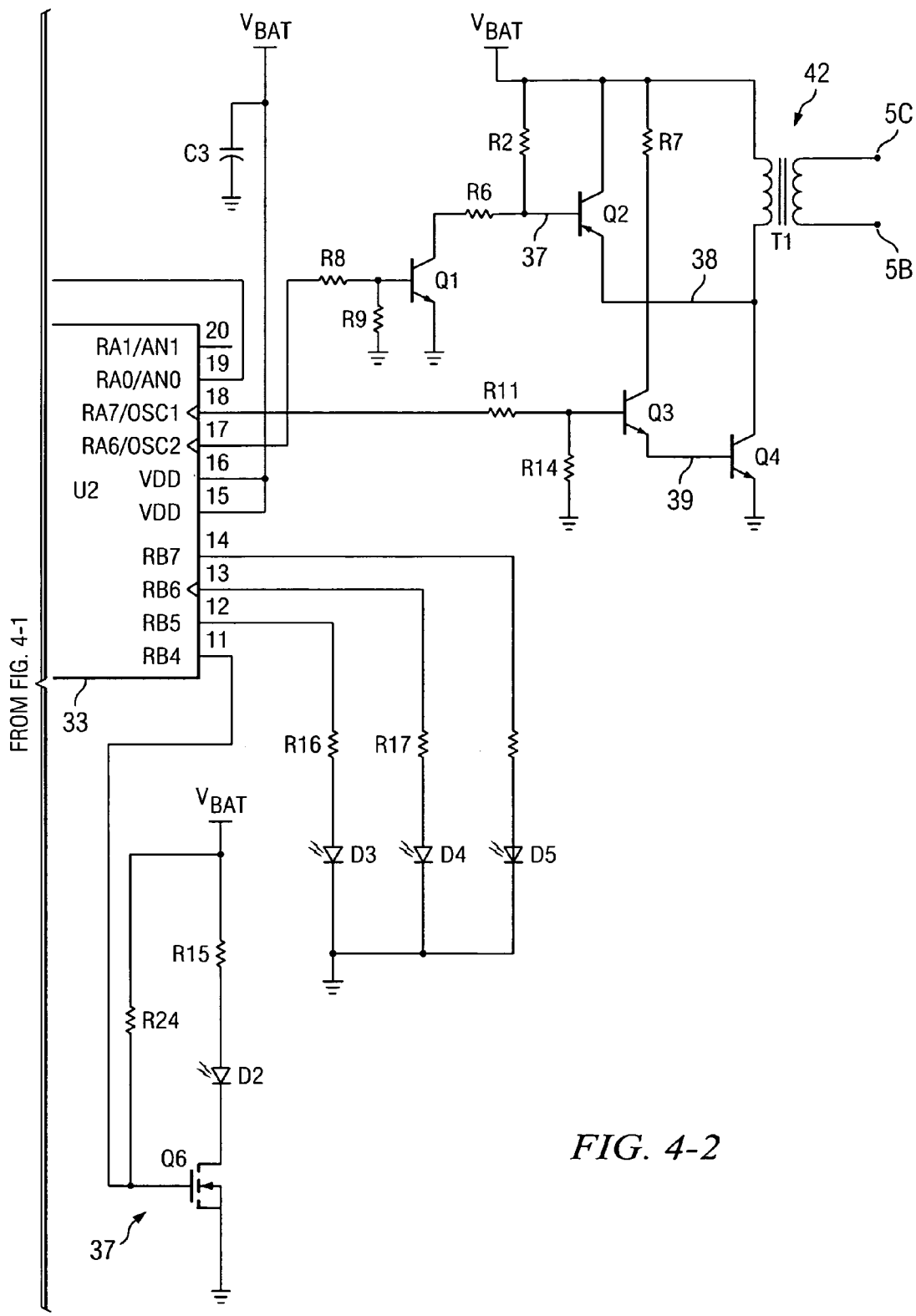

Referring to FIGS. 4-1 and 4-2, the circuitry of bark limiter 1 is provided on the upper surface of printed circuit board 15A (FIG. 3A), and includes vibration sensor assembly 30 which includes above mentioned dome-shaped membrane 6, piezoelectric transducer 21, and the above-mentioned nipple 11 formed on the underside of membrane 6 in order to efficiently transmit vibrations from membrane 6 to piezoelectric transducer 21. One of the electrodes of piezoelectric transducer 21 is connected to ground and the other is coupled by capacitor C4 and resistor R10 to the (−) input of an operational amplifier 31. The (+) input of operational amplifier 31 is connected to the junction between resistor R12 and resistor R13. The other terminal of resistor R12 is connected to ground, and the other terminal of resistor R13 is connected to one terminal of resistor R4 and to the RA0 input on lead 19 of microcontroller 33. The other terminal of resistor R4 is connected to the battery voltage VBAT.

The output of operational amplifier 31 is connected by conductor 32 to the RA2 input on lead 1 of microcontroller 33 and also is connected to one terminal of capacitor C2 and one terminal of resistor R5. The other terminals of resistors R5 and capacitor C2 are connected to the (−) input of operational amplifier 31. The RA2 input of microcontroller 33 is connected to one input of an internal comparator, the other input of which is connected to the RA0 terminal of microcontroller 33, in order to produce an internal square waveform to be used as an input to the internal microprocessor portion of microcontroller 33, to allow the frequency of the square waveform to be determined. The capacitor C2 functions as a low pass filter that sets the upper cutoff frequency of operational amplifier 31. The resistors R5 and R10 to determine the gain of operational amplifier 31.

Voltage monitor circuit 34 in FIG. 4 produces a low output voltage if VBAT is less than approximately 2 volts, and the junction between resistors R3 and R22, which are coupled in series between VBAT and the output of voltage detector 34, applies a reset signal to the microcontroller reset input MCLR on lead 4 thereof if VBAT is below approximately 2 volts. A resistor R4, in combination with resistors R13 and R12, forms a threshold circuit that establish a threshold voltage to be applied to the internal comparator of microcontroller 33 via its RA0 input. The output of the internal comparator of microcontroller 33 is produced on lead 2 of microcontroller 33, which is externally connected to the CCP1 input on lead 2 of microcontroller 33.

The RB2, 4, 5, 6, and 7 outputs of microcontroller 33 selectively turn on LEDs D1–5, respectively, in response to the pressing of membrane switch 17. However, if microcontroller 33 is reset as a result of VBAT being less than 2.2 volts, microcontroller 33 produces high impedance outputs, and in that case, resistors R23 and R24 pull the gate voltages of MOSFETs Q5 and Q6 to VBAT thereby turning them a on and allowing the battery to discharge completely through light emitting diodes D4 and D5, turning them both on until the battery is completely dead. If LEDs D4 and D5 emit light simultaneously, that indicates that the battery is discharged and needs to be replaced.

The RA6 output on lead 17 of microcontroller 33 is coupled to the base of an NPN transistor Q1 having its emitter connected to ground and its collector coupled by a resistor R6 to the base of a PNP transistor Q2 having its collector connected to VBAT and its emitter connected by conductor 38 to one terminal of the primary winding of output transformer 42. The base of transistor Q2 also is coupled by a resistor R2 to VBAT. The RA7 output on lead 18 of microcontroller 33 is coupled to the base of an NPN transistor Q3 which has its collector coupled by resistor R7 to VBAT and its emitter connected to the base of an NPN transistor Q4. The emitter of transistor Q4 is connected to ground and its collector is connected to conductor 38. The other terminal of the primary winding of output transformer 42 is connected to VBAT. The secondary winding terminals 5B and 5C are connected to the two stimulus electrodes 5.

Microcontroller 33 operates to produce a burst of pulses which are applied to the base of transistor Q4 via the Darlington circuit configuration including transistor Q3. The intensity of the stimulation applied to the dog's neck is controlled by synchronously turning on shunt transistor Q2 to divert a controlled amount of the collector current of transistor Q4 away from the primary winding of transformer 42.

By way of definition, the terms "controller" and "microcontroller" is used herein is intended to encompass any microcontroller, digital signal processor (DSP), logic circuitry, state machine, and/or programmed logic array (PLA) that performs functions of microcontroller 33 as described above.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, the stabilizing post could be a conductive stimulus probe that is electrically connected to one of the other two stimulus probes. Furthermore, the described stabilizing post can be just as useful on various electronic animal training devices other than bark limiters, for example on remotely controlled electro-stimulus receiver units. The described stabilizing post may be as useful on electro-stimulus units mounted on animals other than dogs, for example on horses.

What is claimed is:

1. An electronic apparatus for training an animal, comprising:
   (a) a housing supported against the animal's skin by a strap;
   (b) first and second stimulus electrodes connected to a surface of the housing;
   (c) control circuitry in the housing including output terminals producing predetermined aversive stimulus signals between the first and second stimulus electrodes;
   (d) a non-conductive stabilizing member connected to a location of the surface of the housing that is offset from a straight line between the first and second stimulus electrodes,
   whereby conductive tips of the first and second stimulus electrodes and the tip of the stabilizing member are pressed against the skin of the animal and prevent rocking of the conductive tips of the first and second stimulus electrodes against the skin of the animal to reduce the occurrence and severity of skin sores.

2. The electronic apparatus of claim 1 wherein each of the first and second stimulus electrodes includes an elongated conductive probe coupled to the control circuitry and an insulator surrounding a portion of that stimulus electrode, an end portion of that stimulus electrode extending only sufficiently far beyond the insulator to avoid substantial shunting of electrical stimulus current between the first and second stimulus electrodes through the animal's fur when the animal's fur is wet.

3. The electronic apparatus of claim 2 wherein the end portion of each stimulus electrode extends approximately $1/10$ of an inch beyond the insulator of that stimulus electrode.

4. A collar-mounted electronic apparatus for training an animal, comprising:
   (a) a housing supported by a collar for attachment to the animal's neck;
   (b) first and second stimulus electrodes connected to a top surface of the housing;

(c) control circuitry in the housing including output terminals producing predetermined aversive stimulus signals between the first and second stimulus electrodes;

(d) a non-conductive stabilizing post connected to a location of the top surface of the housing that is offset from a straight line between the first and second stimulus electrodes so that conductive tips of the first and second stimulus electrodes and a tip of the stabilizing post define a triangle, whereby conductive tips of the first and second stimulus electrodes and the tip of the stabilizing post are pressed against the neck of the animal and prevent rocking of the conductive tips of the first and second stimulus electrodes against the neck of the animal to reduce the occurrence and severity of neck sores.

5. An electronic apparatus for control of nuisance vocalizations by a dog, comprising:

(a) a housing supported by a strap against the dog's skin;

(b) first and second stimulus electrodes connected to a surface of the housing;

(c) a sensor supported by the housing for producing signals in response to vocalization by the dog;

(d) control circuitry in the housing having an input coupled to an output of the sensor, the control circuitry including output terminals coupled to produce aversive stimulus signals between the first and second stimulus electrodes in response to the signals produced in response to the vocalization by the dog;

(e) a non-conductive stabilizing member connected to a location of the surface of the housing that is offset from a straight line between the first and second stimulus electrodes so that conductive tips of the first and second stimulus electrodes and a tip of the stabilizing post define a triangle, whereby conductive tips of the first and second stimulus electrodes and the tip of the stabilizing member are pressed against the skin of the dog and prevent rocking of the conductive tips of the first and second stimulus electrodes against the skin of the dog to reduce the occurrence and severity of skin sores.

6. A collar-mounted electronic apparatus for control of barking by a dog, comprising:

(a) a housing supported by a collar for attachment to the dog's neck;

(b) first and second stimulus electrodes connected to a top surface of the housing;

(c) a vibration sensor supported by the housing for detecting vibrations caused by barking by the dog;

(d) control circuitry in the housing having an input coupled to an output of the vibration sensor, the control circuitry including output terminals coupled to produce aversive stimulus signals between the first and second stimulus electrodes in response to barking by the dog;

(e) a non-conductive stabilizing post connected to a location of the top surface of the housing that is offset from a straight line between the first and second stimulus electrodes so that conductive tips of the first and second stimulus electrodes and a tip of the stabilizing post define a triangle, whereby conductive tips of the first and second stimulus electrodes and the tip of the stabilizing post are pressed against the neck of the dog and prevent rocking of the conductive tips of the first and second stimulus electrodes against the neck of the dog to reduce the occurrence and severity of neck sores.

7. The collar-mounted apparatus of claim 6 wherein the heights of the first and second stimulus electrodes and the stabilizing post are at least approximately equal.

8. A method of training an animal, comprising:

(a) supporting an electronic training device against the animal's skin, the electronic training device including a housing and first and second stimulus electrodes connected to a surface of the housing and control circuitry in the housing including output terminals producing predetermined aversive stimulus signals between the first and second stimulus electrodes; and (b) preventing rocking of the conductive tips of the first and second stimulus electrodes on the skin of the animal by providing a non-conductive stabilizing member that is connected to a location of the surface of the housing and that is offset from a straight line between the first and second stimulus electrodes wherein conductive tips of the first and second stimulus electrodes and the tip of the stabilizing member are pressed against the skin of the animal and stabilize the electronic training device so as to prevent the rocking and thereby reduce the occurrence and severity of skin sores.

9. An electronic apparatus for training an animal, comprising:

(a) means for supporting the electronic training device against the animal's skin;

(b) a housing and first and second stimulus electrodes connected to a surface of the housing;

(c) control circuitry in the housing including output terminals connected to produce predetermined aversive stimulus signals between the first and second stimulus electrodes; and (d) non-conductive stabilizing means that is connected to a location of the surface of the housing and that is offset from a straight line between the first and second stimulus electrodes for preventing rocking of conductive tips of the first and second stimulus electrodes on the skin of the animal wherein conductive tips of the first and second stimulus electrodes and the tip of the stabilizing member are pressed against the skin of the animal and are prevented from rocking and thereby reduce the occurrence and severity of skin sores.

* * * * *